US005753844A

United States Patent [19]

Matsumoto

[11] Patent Number: 5,753,844

[45] Date of Patent: May 19, 1998

[54] MUSIC PLAY APPARATUS WITH ADVANCE RESETTING FOR SUBSEQUENT PLAYING

[75] Inventor: Shuichi Matsumoto, Hamamatsu, Japan

[73] Assignee: Yamaha Corporation, Hamamatsu, Japan

[21] Appl. No.: 857,695

[22] Filed: May 16, 1997

[30] Foreign Application Priority Data

May 20, 1996 [JP] Japan .................................... 8-124809
May 20, 1996 [JP] Japan .................................... 8-124810

[51] Int. Cl.[6] .............................. G09B 5/00; G10H 1/06; G10H 7/00

[52] U.S. Cl. ................................ 84/609; 84/617; 84/622; 84/645; 434/307 A

[58] Field of Search ..................... 84/609–625, 634–638, 84/645; 434/307 A; 348/7; 370/437

[56] References Cited

U.S. PATENT DOCUMENTS

| | | | |
|---|---|---|---|
| 5,663,515 | 9/1997 | Kato | 84/609 |
| 5,668,339 | 9/1997 | Shin | 84/634 |
| 5,675,509 | 10/1997 | Ikami et al. | 370/437 X |

*Primary Examiner*—Stanley J. Witkowski
*Attorney, Agent, or Firm*—Pillsbury Madison & Sutro LLP

[57] ABSTRACT

A music play apparatus has a data supply unit for providing performance data and initialization data associated to a desired music piece, and a sound source unit for reproducing the music piece according to the performance data and the initialization data. The data supply unit has a sequencer device that time-sequentially processes a plurality of performance data according to a predetermined order of music pieces, and a transmitter device that transmits each of the processed performance data. The transmitter device is operative when transmitting the performance data of a preceding music piece to interlace the initialization data of a succeeding music piece into the performance data of the preceding music piece by multiplexing operation. The sound source unit has a receiver device that successively receives the performance data in the predetermined order. The receiver device operates when receiving the performance data of the preceding music piece to separate therefrom the initialization data of the succeeding music piece by demultiplexing operation. A memory device temporarily stores the separated initialization data of the succeeding music piece while the preceding music piece is being reproduced. A tone generator device is customized to the succeeding music piece by the stored initialization data immediately after the reproduction of the preceding music piece is finished, and then readily starts the reproduction of the succeeding music piece according to the performance data thereof which is fed from the receiver device to thereby ensure substantially non-interruptive reproduction of the preceding music piece and the succeeding music piece.

17 Claims, 5 Drawing Sheets

MUSIC PLAY APPARATUS WITH ADVANCE RESETTING FOR SUBSEQUENT PLAYING

BACKGROUND OF THE INVENTION

1. Field of the Invention

The present invention relates to a music play apparatus for generating musical tones based on performance data which is supplied in time sequence after initialization has been performed for playing of one music piece. More particularly, the present invention relates to the music play apparatus operative when playing different music pieces continuously for shortening a blank time between these music pieces.

2. Description of Related Art

Generally, the music play apparatus is composed of a data supply unit for supplying performance data in time sequence in synchronization with progression of a music piece being played and a sound source unit for generating musical tones based on the supplied performance data.

The data to be transferred by the data supply unit includes control parameters for controlling generation of musical tones in addition to the performance data. Based on these control parameters, the sound source unit is initialized so that timbre characteristics of musical tones to be generated are set, and acoustic effects to be given to the generated musical tones are set.

When playing a music piece, the data supply unit supplies the necessary control parameters to the sound source unit to initialize the same. Consequently, the sound source unit is adapted to the musical tones and effects of the music piece to be generated. Then, the data supply unit supplies the performance data in time sequence according to a desired tempo counted by an internal timer or the like to the sound source unit to have the same generate the specified musical tones.

In the prior art music play apparatus mentioned above, when plural music pieces are played in a specified sequence as in a jukebox for example, the data supply unit as mentioned above simply transfers the data in the following sequence. That is, when playing n number of music pieces continuously, the data supply unit transfers the control parameters associated with the first music piece, the performance data associated with the first music piece, the control parameters associated with the second music piece, the performance data associated with the second music piece, . . . , the control parameters associated with the n-th music piece, and the performance data associated with the n-th music piece in this order. Based on such a data transfer, the sound source unit plays the first through n-th music pieces sequentially.

However, the control parameters are used to make various settings of the sound source unit, and therefore do not by themselves contribute to sounding of musical tones. Consequently, in continuous playing of plural music pieces, there is a silent time interval between the music pieces, during which the control parameters are transferred to the sound source unit. That is, there is a blank period in which no musical tone is generated between the music pieces.

SUMMARY OF THE INVENTION

It is therefore an object of the present invention to provide a music play apparatus that minimizes, when playing plural music pieces continuously, a time blank between these music pieces.

According to the invention, a music play apparatus comprises a data supply unit for providing performance data and initialization data associated to a desired music piece, and a sound source unit for reproducing the music piece according to the performance data and the initialization data. The data supply unit comprises a sequencer device that time-sequentially processes a plurality of performance data according to a predetermined order of music pieces, and a transmitter device that transmits each of the processed performance data, the transmitter device being operative when transmitting the performance data of a preceding music piece to interlace the initialization data of a succeeding music piece into the performance data of the preceding music piece by multiplexing operation. The sound source unit comprises a receiver device that successively receives the performance data in the predetermined order, the receiver device being operative when receiving the performance data of the preceding music piece to separate therefrom the initialization data of the succeeding music piece by demultiplexing operation, a memory device that temporarily stores the separated initialization data of the succeeding music piece while the preceding music piece is being reproduced, and a tone generator device that is customized to the succeeding music piece by the stored initialization data immediately after the reproduction of the preceding music piece is finished, and then readily starts the reproduction of the succeeding music piece according to the performance data thereof which is fed from the receiver device to thereby ensure substantially non-interruptive reproduction of the preceding music piece and the succeeding music piece.

In a form, sound source unit further comprises a selector device that operates when the reproduction of the preceding music piece is finished for switching the memory device from one memory bank which stores the initialization data of the preceding music piece to another memory bank which stores the initialization data of the succeeding music piece, and for resetting the tone generator device upon switching of the memory device to customize the tone generator device to the succeeding music piece. Further, the selector device includes a bank selector that connects said one memory bank to the receiver device when the same receives the performance data of the succeeding music piece so as to load said one memory bank with new initialization data which is separated from the performance data of the succeeding music piece by the receiver device.

In another form, the tone generator device is customized to the succeeding music piece for generating musical tones having a timbre adapted to the succeeding music piece. The tone generator device is further customized to the succeeding music piece for imparting an effect to the musical tones in matching with the succeeding music piece.

Preferably, the sequencer device processes the performance data of the preceding music piece to form a train of segments of the performance data, and processes the initialization data of the succeeding music piece to form another train of segments of the initialization data, and the transmitter device interlaces the segments of the initialization data into the segments of the performance data to form a composite train which alternately contains the segments of the performance data of the preceding music piece and the segments of the initialization data of the succeeding music piece. In such a case, the sequencer device affixes a header to each segment of the performance data of the preceding music piece to indicate that each segment is associated to the preceding music piece, and affixes another header to each segment of the initialization data of the succeeding music piece to indicate that each segment is associated to the succeeding music piece. The sound source unit discriminates the performance data and the initialization data from each other according to the headers affixed thereto.

In a form, the transmitter device concurrently transmits last segments of the performance data of the preceding music piece and top segments of the performance data of the succeeding music piece with each other so that the sound source unit can cross-fade the preceding music piece and the succeeding music piece during the non-interruptive reproduction of the preceding music piece and the succeeding music piece.

According to the present invention, the performance data associated with the first music piece is multiplexed with the initialization data associated with the second music piece to be played after the first music piece. The resultant multiplexed data is transferred to the sound source unit. The transferred data is demultiplexed into the performance data and the initialization data. The initialization data is stored in the memory device. Consequently, during transfer of the performance data associated with the first music piece for playing of the first music piece, the initialization data associated with the second music piece is all transferred together with the performance data associated with the first music piece. The initialization of the sound source unit for the second music piece can be performed based on the stored initialization data upon termination of the first music piece. Therefore, it is no more necessary to newly transfer the initialization data associated with the second music piece after transfer of the performance data associated with the first music piece, thereby shortening a time interval between the first and second music pieces which are played continuously. Preferably, in this case, the memory device has a pair of memory banks for storing the initialization data for two music pieces. According to this constitution, when one music piece has finished, the initialization data stored in one memory bank can be switched to next initialization data stored in the other memory bank for initialization. Therefore, the capacity of the memory device may only be enough for storing the initialization data for two music pieces. Furthermore, after the switching, the initialization data for the third music piece is stored in the one memory bank that has previously stored the initialization data assigned to the first music piece. Therefore, three or more music pieces can continue, while the time interval between the successive music pieces can be shortened.

According to the specific aspect of the present invention, the performance data associated with the first music piece is multiplexed with the initialization data associated with the second music piece to be played after the first music piece. The performance data is affixed with a header which indicates that the performance data is supplied from one sequencer assigned to the first music piece. The control initialization data including parameters is affixed with another header which indicates that the control parameters are supplied from the other sequencer assigned to the second sequencer. The resultant multiplexed data is transferred to the sound source unit. The transferred data is demultiplexed into the performance data and the initialization data. The initialization data is stored in a memory bank of the memory device designated according to the affixed header. Consequently, during transfer of the performance data associated with the first music piece for playing of the first music piece, the initialization data associated with the second music piece is all transferred together with the performance data associated with the first music piece. The initialization of the sound source unit for the second music piece can be performed based on the stored initialization data upon termination of the first music piece. Therefore, it is no more necessary to newly transfer the initialization data associated with the second music piece after transfer of the performance data associated with the first music piece, thereby shortening the time interval between the first and second music pieces which are played continuously. Preferably, in this case, the memory device has a pair of memory banks for storing the initialization data for two music pieces. According to this constitution, the header is designed such that, when one music piece has finished, the initialization data stored in one memory bank can be switched to the other initialization data stored in the other memory bank for initialization. Therefore, the capacity of the memory device may only be enough for storing the initialization data for two music pieces. Furthermore, after the switching, the initialization data for the third music piece is stored in the one memory bank that has previously stored the initialization data assigned to the first music piece. Therefore, three or more music pieces can continue, while the time interval between the successive music pieces can be shortened. Further, the last part of the performance data of the first music piece is interlaced with the top part of the performance data of the second music piece so that the first music piece can fade out while the second music piece can fade in without increasing a number of channels of the tone generator device.

The above and other objects, features and advantages of the present invention will become more apparent from the accompanying drawings, in which like reference numerals are used to identify the same or similar parts in several views.

DETAILED DESCRIPTION OF THE PREFERRED EMBODIMENTS

Figure 1:
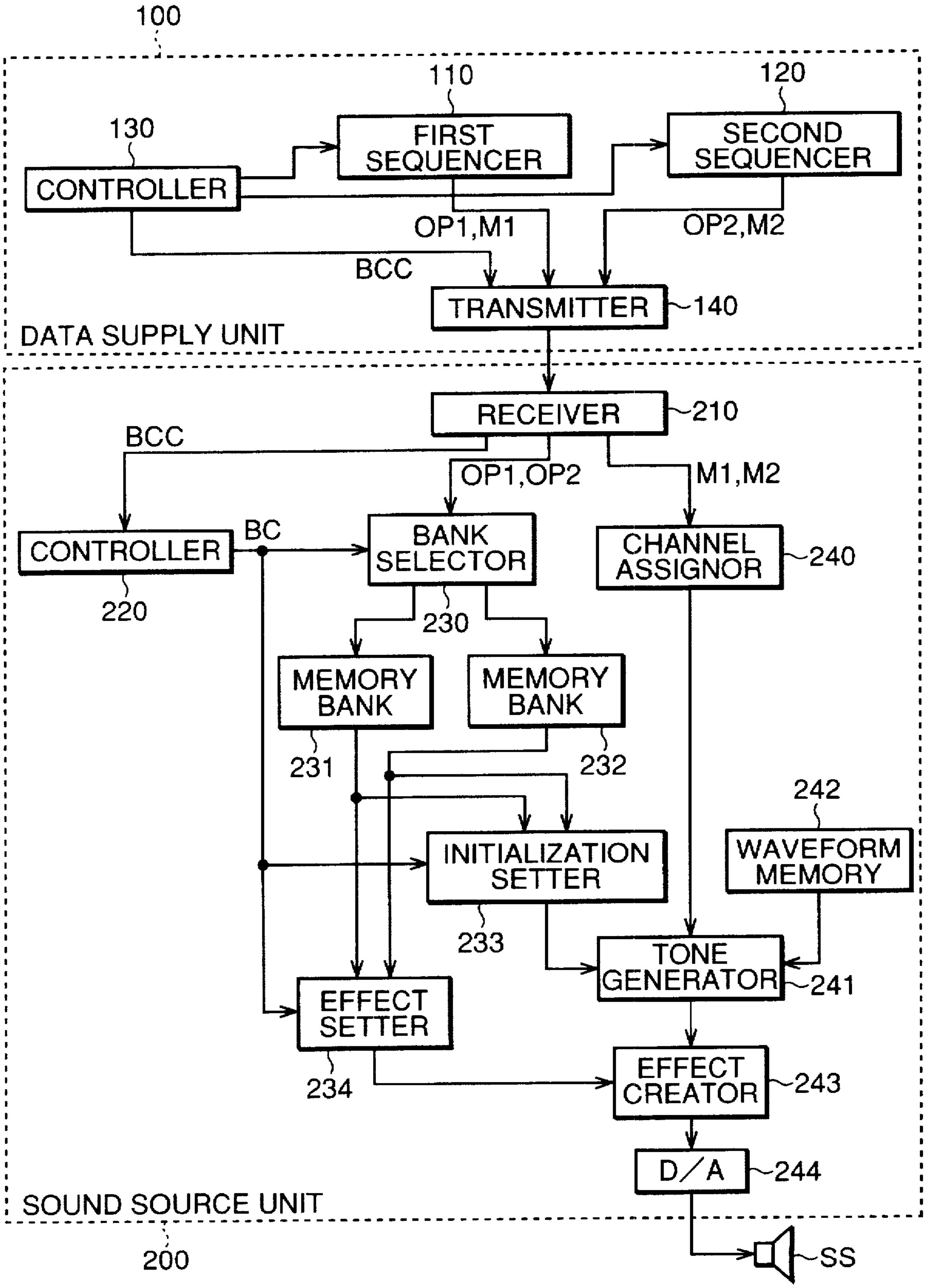
FIG. 1 is a block diagram illustrating a functional constitution of the music play apparatus practiced as a first preferred embodiment of the present invention.

The present invention will be described in further detail by way of example with reference to the accompanying drawings. FIG. 1 shows a functional constitution of the music play apparatus practiced as the first preferred embodiment of the present invention. As shown in the figure, the preferred embodiment is generally divided into a data supply unit 100 for transferring data for generating musical tones and a sound source unit 200 for generating the musical tones based on the data transferred from the data supply unit.

First, the data supply unit 100 will be described. In FIG. 1, reference numerals 110 and 120 denote a pair of sequencers for supplying performance data of MIDI (Music Instrument Digital Interface) standard for example to the sound source unit 200 in time sequence. Before supplying performance data M1 of a first music piece, the first sequencer 110 supplies initialization data including control parameters OP1 that are used to perform the initialization of the sound source unit 220 for sounding the first music piece based on that performance data and for setting characteristics of acoustic effects to be imparted to the first music piece. Likewise, the second sequencer 120 supplies control parameters OP2 assigned to a second music piece before transfer of performance data M2 assigned to the second music piece. Generally, in MIDI, complete music data necessary for playing one music piece includes performance data and control parameters as described above, which are stored as a file corresponding to each music piece in a database.

Reference numeral 130 denotes a controller that controls the data supplying operations by the first and second sequencers 110 and 120, and outputs a bank change command BCC immediately before the music data is supplied. Reference numeral 140 denotes a transmitter that multiplexes the performance data supplied from one sequencer the control parameters supplied from the other sequencer, and the bank change command BCC, and sends the resultant composite data to the sound source unit 200.

In what follows, the constitution of the sound source unit 200 will be described. Reference numeral 210 denotes a receiver that demultiplexes the data sent from the transmitter 140, and transfers the demultiplexed items of data to the following sections. To be specific, the receiver 210 transfers the bank change command BCC to a controller 220, transfers the control parameters OP1 or OP2 to a bank selector 230, and transfers the performance data M1 or M2 to a channel assignor 240.

When receiving the bank change command BCC demultiplexed by the receiver 210, the controller 220 controls the bank selector 230, an initialization setter 233, and an effect setter 234. The bank selector 230 is controlled to switch a pair of memory banks 231 and 232 alternately with each other. The controller 220 operates to feed the control parameters stored in the switched memory bank to the initialization setter 233 as timbre initialization data for a tone generator 241. On the other hand, the controller 220 issues a command BC to the effect setter 234 to instruct the same to set the control parameters stored in the switched memory bank as effect initialization data for an effect creator 243. The bank selector 230 selects the memory bank 231 or 232 to enable the selected memory bank to store the transferred parameters OP1 or OP2. The memory banks 231 and 232 correspond to the first and second sequencers 110 and 120, respectively. Each memory bank stores the control parameters for one music piece.

The tone generator 241 has a plurality of channels (16, for example), initializes the channels by use of the control parameters set in either of the memory banks, and generates a musical tone in each channel based on the performance data allocated to each channel. The memory bank to be used for the initialization by the tone generator 241 is addressed by the initialization setter 233. The channel assignor 240 allocates the performance data demultiplexed by the receiver 210 to the channels of the tone generator 241. A waveform memory 242 stores waveforms representative of various timbres of musical instruments. In such a constitution, the tone generator 241 generates a musical tone by selecting one of the waveforms according to the tone quality specified by the performance data and by reading the selected waveform at a rate corresponding to a pitch specified by the performance data.

The effect creator 243 imparts predetermined effects such as chorus, reverberation, and pan to a signal of the musical tone generated by the tone generator 241. The effects to be provided here are determined by the control parameters set in either of the memory banks. It should be noted that the memory bank addressing is performed by the effect setter 234.

The musical tone signal provided with effects by the effect creator 243 is converted into an analog audio signal by a D/A converter 244. Then, the analog audio signal is sounded by a sound system SS composed of an amplifier, a loudspeaker and so on.

Figure 2:
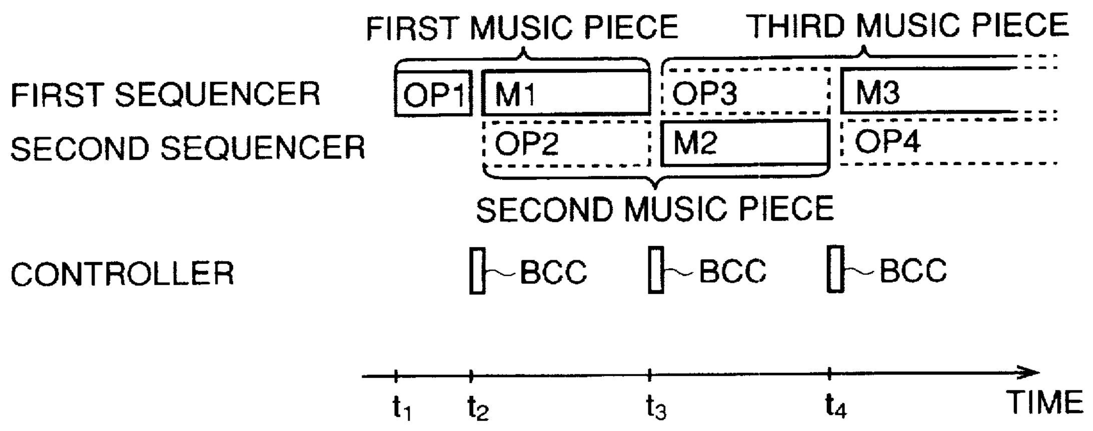
FIG. 2(A) is a diagram illustrating a state of transferring the control parameters and performance data in the embodiment of FIG. 1.
FIG. 2(B) is a diagram illustrating a state of transferring the performance data and control parameters in the embodiment of FIG. 1.
Figure 2:
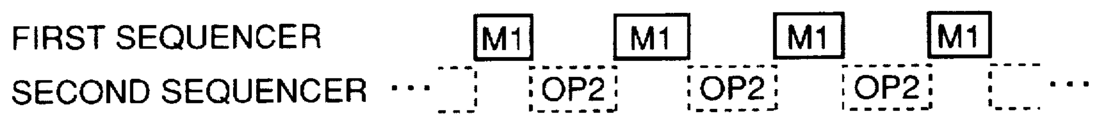

The following describes the operation of the music play apparatus practiced as the first embodiment. FIG. 2(A) shows the state of the data transfer from the data supply unit 100 to the sound source unit 200 in time sequence. First, before the operation of the present embodiment starts, it is assumed that a music piece to be played first and subsequent music pieces are selected by the user through an operator section not shown, assumed that files of the music pieces to be played at odd-numbered sequence are supplied to the first sequencer 110, and assumed that files of music pieces to be played at even-numbered sequence are supplied to the second sequencer 120. It is also assumed that the memory bank 232 is addressed by the initialization setter 233 and the effect setter 234 in the initial state.

Based on the above-mentioned assumptions, the controller 130 controls, at time t1, the first sequencer 110 to output the control parameters OP1 associated with the first music piece before starting reproduction of the first music piece. The first sequencer 110 outputs the control parameters OP1 associated with the first music piece as specified. Data containing the control parameters OP1 outputted from the first sequencer 110 are transferred to the sound source unit 200 via the transmitter 140.Then, the transmitted data are demultiplexed by the receiver 210 to extract therefrom the control parametrs. At this point of time, other data than the control parameters are not extracted because the transmitted data only contains the control parameters. The extracted initialization data is stored in the memory bank 231 corresponding to the first sequencer 110 via the bank selector 230.

When the control parameters OP1 associated with the first music piece have all been transferred and stored in the memory bank 231, the controller 130 then outputs a bank change command BCC at time t2. The outputted bank change command BCC is transferred to the sound source unit 200 via the transmitter 140. In the sound source unit 200, this command is demultiplexed by the receiver 210 and is supplied to the controller 220. Upon receiving the bank change command BCC, the controller 220 outputs a command BC to control the bank selector 230, the initialization setter 233, and the effect setter 234. The bank selector 230 is controlled to change the memory bank selected so far to the other memory bank. It should be noted that, immediately before time t2, the bank selector 230 has selected the memory bank 231 in the initial state. On the other hand, the initialization setter 233 and the effect setter 234 have addressed the memory bank 232 corresponding to the second sequencer 120 in the initial state. Therefore, subsequent to time t2 at which the bank change command BCC is issued, the bank selector 230 selects the memory bank 232, while the initialization setter 233 and the effect setter 234 switch to address the memory bank 231.

Also, immediately before time t2, the control parameters OP1 associated with the first music piece have all been stored in the memory bank 231. Consequently, the initialization based on the control parameters OP1 associated with the first music piece and stored in the memory bank 231 is performed in the tone generator 241 in response to the first bank change command BCC. At the same time, the effect setting based on the same control parameters OP1 is performed in the effect creator 243.

After outputting the bank change command BCC, the controller 130 controls the first sequencer 110 to output the performance data M1 associated with the first music piece in time sequence synchronously with the progression of the first music piece. The first sequencer 110 outputs the performance data M1 associated with the first music piece in time sequence as specified. The outputted performance data M1 is transferred to the sound source unit 200 via the transmitter 140.Then, the performance data M1 is demultiplexed by the receiver 210 and supplied to the channel assignor 240. Receiving the performance data M1, the channel assignor 240 allocates a channel to the performance data M1 and supplies the same to that channel in the tone generator 241. Receiving the performance data M1, the tone generator 241 generates a musical tone based on the performance data M1 through the allocated channel. Since the initialization has been already completed according to the control parameters OP1 associated with the first music piece, the characteristics of the generated musical tone of the first music piece are based on the parameters OP1. Further, the generated musical tone is provided with effects by the effect creator 243. The effects are created based on the control parameters OP1 associated with the first music piece. It should be noted that the effect creator 243 have been already adapted to the first music piece. Thus, the first music piece is reproduced based on the performance data M1 supplied in time sequence and based on the control parameters OP1. Further, the reproduced music piece is provided with the specified effects.

The above-mentioned performance data is transferred in a train of segments each corresponding to each of note events as shown in FIG. 2(B). There exist many time slots between the segments of the performance data M1 after time t2. Using these time slots, the controller 130 controls the second sequencer 120 to output the control parameters OP2 associated with the second music piece. The control parameters OP2 thus outputted are multiplexed by the transmitter 140 with the performance data M1 outputted by the first sequencer 110. The multiplexed data is transferred to the sound source unit 200. Namely, when the first music piece is being played subsequent to time t2, the control parameters OP2 associated with the second music piece are transferred to the sound source unit 200. The control parameters OP2 are interlaced into the time slots provided in the train of the performance data M1. Then, the control parameters OP2 transferred to the sound source unit 200 are demultiplexed by the receiver 210, and are supplied to the bank selector 230. Since the bank selector 230 has selected the memory bank 232 as instructed by the bank change command BCC at time t2, the control parameters OP2 are stored in the memory bank 232. As described, while the first music piece is being played by transferring the performance data M1, the control parameters OP2 associated with the second music piece can all be stored in the corresponding memory bank 232.

Immediately after completion of the transfer of all the performance data M1 associated with the first music piece and all the control parameters OP2 associated with the second music piece, the controller 130 outputs another bank change command BCC at time t3. Like the first bank change command BCC, the second bank change command BCC is supplied to the controller 220 in the sound source unit 200. Upon receiving the second bank change command, the controller 220 controls the bank selector 230, the initialization setter 233, and the effect setter 234.The bank selector 230 is controlled to switch the memory bank selected so far to the other memory bank. It should be noted that the bank selector 230 has selected the memory bank 232 immediately before time t3, while the initialization setter 233 and the effect setter 234 have selected the memory bank 231. Therefore, in response to the second bank change command BCC, the bank selector 230 selects the memory bank 231, while the initialization setter 233 and the effect setter 234 select the memory bank 232.

Immediately before time t3, all of the control parameters OP2 associated with the second music piece are stored in the memory bank 232. Therefore, the control parameters OP2 stored in the memory bank 232 are used for the initialization of the tone generator 241 and used for the effect setting by the effect creator 243 immediately after reception of the second bank change command. Consequently, in response to the second bank change command BCC, the initialization of the tone generator 241 is effected based on the control parameters OP2 associated with the second music piece which are stored in the memory bank 232, while the effect setting based on the control parameters OP2 is performed in the effect creator 243.

In similar manner, if a music piece to be played third is set in the data supply unit 100, the performance data M2 associated with the second music piece is multiplexed with control parameters OP3 associated with the third music piece. The multiplexed data is transferred to the sound source unit 200. Meanwhile, in the sound source unit 200, musical tones of the second music piece are generated based on the performance data M2 associated with the second music piece. At the same time, the control parameters OP3 associated with the third music piece are stored in the memory bank 231 by overwriting the old control parameters OP1. Then, immediately after completion of the transfer of all performance data M2 associated with the second music piece and all control parameters OP3 associated with the third music piece, still another bank change command BCC is issued.

For summary, in this embodiment, the music play apparatus comprises a data supply unit 100 for providing performance data and initialization data associated to a desired music piece, and a sound source unit 200 for reproducing the music piece according to the performance data and the initialization data. The data supply unit 100 comprises a sequencer device 110 and 120 that time-sequentially processes a plurality of performance data according to a predetermined order of music pieces, and a transmitter device 140 that transmits each of the processed performance data. The transmitter device 140 is operative when transmitting the performance data of a preceding music piece to interlace the initialization data of a succeeding music piece into the performance data of the preceding music piece by multiplexing operation. The sound source unit 200 comprises a receiver device 210 that successively receives the performance data in the predetermined order. The receiver device 210 is operative when receiving the performance data of the preceding music piece to separate therefrom the initialization data of the succeeding music piece by demultiplexing operation. A memory device 231 and 232 temporarily stores the separated initialization data of the succeeding music piece while the preceding music piece is being reproduced. A tone generator device including a tone generator 241 is customized to the succeeding music piece by the stored initialization data immediately after the reproduction of the preceding music piece is finished, and then readily starts the reproduction of the succeeding music piece according to the performance data thereof which is fed from the receiver device 210 to thereby ensure substantially non-interruptive reproduction of the preceding music piece and the succeeding music piece.

In a form, the sound source unit 200 further comprises a selector device 220 and 230 that operates when the reproduction of the preceding music piece is finished for switching the memory device from one memory bank 231 which stores the initialization data of the preceding music piece to another memory bank 232 which stores the initialization data of the succeeding music piece, and for resetting the tone generator 241 upon switching of the memory device to customize the tone generator 241 to the succeeding music piece. Further, the selector device 220 and 230 includes a bank selector 230 that connects said one memory bank 231 to the receiver device 210 when the same receives the performance data of the succeeding music piece so as to load said one memory bank 231 with new initialization data which is separated from the performance data of the succeeding music piece by the receiver device 210. In another form, the tone generator device is customized to the succeeding music piece for generating musical tones having a timbre adapted to the succeeding music piece. The tone generator device includes an effect creator 243 which is further customized to the succeeding music piece for imparting an effect to the musical tones in matching with the succeeding music piece.

In general, according to the music play apparatus practiced as the first preferred embodiment of the present invention, during transfer of the performance data associated with the n-th music piece where n is an integer equal to or greater than 1, the control parameters for the next (n+1)-th music piece are transferred and stored in the memory device. Then, the initialization of the tone generator is performed and the effects are specified based on the control parameters for the (n+1)-th music piece immediately after the n-th music piece is finished. This constitution eliminates necessity for transferring the control parameters associated with the (n+1)-th music piece before playing the same, thereby shortening the time blank between the n-th music piece and the (n+1)-th music piece.

It should be noted that the functional constitutions of the data supply unit 100 and the sound source unit 200 can be built by a general personal computer installed with a sound board capable of generating musical tones based on MIDI data for example. To be specific, a plurality of files of MIDI format are stored in a hard disk for example, and desired ones of the files are selected from the hard disk in the order of playback. The selected files are transferred in the above-mentioned interlaced manner.

The time blank between music pieces can also be shortened in a so-called communications karaoke in which the data associated with the music piece to be played are supplied over a communication line by transferring the data to a karaoke terminal having a tone generator in the above-mentioned interlaced manner.

Figure 3:
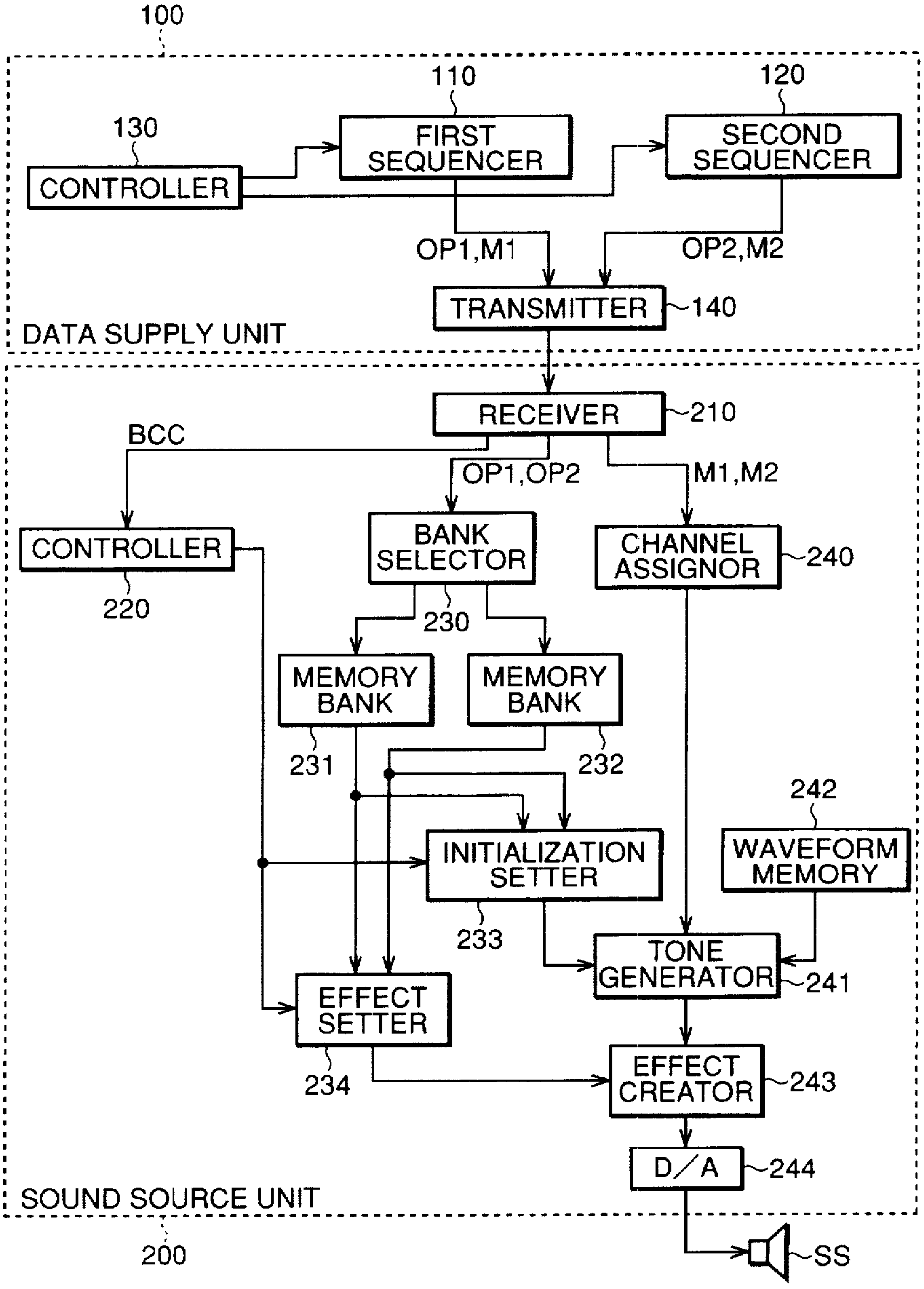
FIG. 3 is a block diagram illustrating a functional constitution of the music play apparatus practiced as a second preferred embodiment of the present invention.

FIG. 3 shows a functional constitution of the music play apparatus practiced as the second preferred embodiment of the present invention. As shown in the figure, the preferred embodiment is generally divided into a data supply unit 100 for transferring data for generating musical tones and a sound source unit 200 for generating the musical tones based on the data transferred from the data supply unit.

First, the data supply unit 100 will be described. In FIG. 3, reference numerals 110 and 120 denote a pair of sequencers for supplying performance data of MIDI (Music Instrument Digital Interface) standard for example to the sound source unit 200 in time sequence. Before supplying performance data M1 of a first music piece, the first sequencer 110 supplies initialization data including control parameters OP1 that are used to perform the initialization of the sound source unit 200 for sounding the first music piece based on the performance data and for setting characteristics of acoustic effects to be imparted to the first music piece. Likewise, the second sequencer 120 supplies control parameters OP2 assigned to a second music piece before transfer of performance data M2 assigned to the second music piece. Generally, in MIDI, complete music data necessary for playing one music piece includes performance data and control parameters as described above, which are stored as a file corresponding to each music piece in a database.

Reference numeral 130 denotes a controller that controls the data supplying operations by the first and second sequencers 110 and 120. Reference numeral 140 denotes a transmitter that multiplexes the performance data supplied from one sequencer and the control parameters supplied from the other sequencer with each other, and sends the resultant composite data to the sound source unit 200. The performance data is affixed with a header which indicates that the performance data is supplied from one sequencer. The control parameters are affixed with another header which indicates that the control parameters are supplied from the other sequencer.

In what follows, the constitution of the sound source unit 200 will be described. Reference numeral 210 denotes a receiver that demultiplexes the data sent from the transmitter 140, and transfers the demultiplexed items of data to the following sections specified by the headers affixed to the respective items of data. To be specific, the receiver 210 interprets the header affixed to the performance data M1 and M2, and issues a bank change command BCC which indicates the sequencer providing the received performance data, to a controller 220. The receiver 210 also transfers the control parameters OP1 or OP2 to a bank selector 230 together with the affixed header, and transfers the performance data M1 or M2 without the header to a channel assignor 240.

When receiving the bank change command BCC from the receiver 210, the controller 220 controls an initialization setter 233 and an effect setter 234 to address a memory bank 231 or 232 corresponding to the sequencer 110 or 120 identified by the header. Namely, the controller 220 operates to feed the control parameters stored in the addressed memory bank to the initialization setter 233 as timbre initialization data for a tone generator 241. On the other hand, the controller 220 issues a command to the effect setter 234 to instruct the same to set the control parameters stored in the addressed memory bank as effect initialization data for an effect creator 243.

The bank selector 230 interprets the header to identify the sequencer which provides the received control parameters. When the header indicates the sequencer 110, the bank selector 230 selects the memory bank 231 to enable the selected memory bank to store the transferred parameters OP1. When the header indicates the other sequencer 120, the bank selector 230 selects the other memory bank 232 to enable the selected memory bank to store the transferred parameters OP2. Namely, the memory banks 231 and 232 are provided corresponding to the first and second sequencers 110 and 120, respectively. Each memory bank stores the control parameters from which the header is removed.

The tone generator 241 has a plurality of channels (16, for example), initializes the channels by use of the control parameters set in either of the memory banks, and generates a musical tone throuth each channel based on the performance data allocated to each channel. The memory bank to be used for the initialization by the tone generator 241 is addressed by the initialization setter 233.

The channel assignor 240 allocates the performance data demultiplexed by the receiver 210 to the channels of the tone generator 241. A waveform memory 242 stores waveforms representative of various timbres of musical instruments. In such a constitution, the tone generator 241 generates a musical tone by selecting one of the waveforms according to the tone quality specified by the performance data and by reading the selected waveform at a rate corresponding to a pitch specified by the performance data.

The effect creator 243 imparts predetermined effects such as chorus, reverberation, and pan to a signal of the musical tone generated by the tone generator 241. The effects to be provided here are determined by the control parameters set in either of the memory banks. It should be noted that the memory bank addressing is performed by the effect setter 234.

The musical tone signal provided with effects by the effect creator 243 is converted into an analog audio signal by a D/A converter 244. Then, the analog audio signal is sounded by a sound system SS composed of an amplifier, a loudspeaker and so on.

Figure 4:
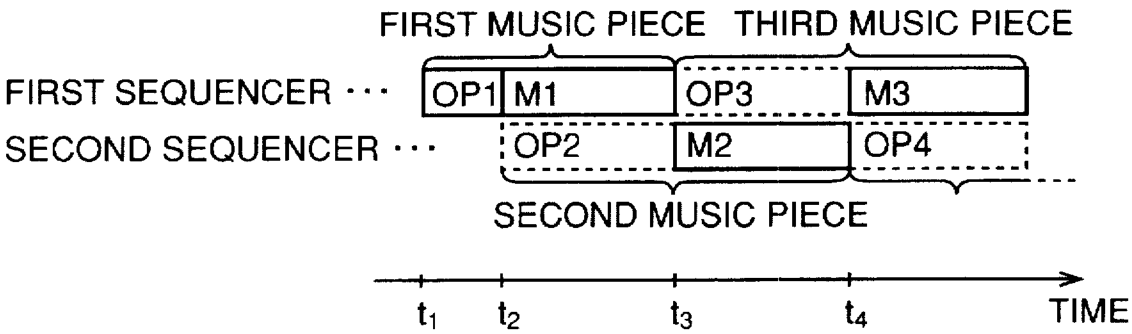
FIG. 4(A) is a diagram illustrating a state of transferring the control parameters and performance data in the embodiment of FIG. 3.
FIG. 4(B) is a diagram illustrating a state of transferring the performance data and control parameters in the embodiment of FIG. 3.
Figure 4:
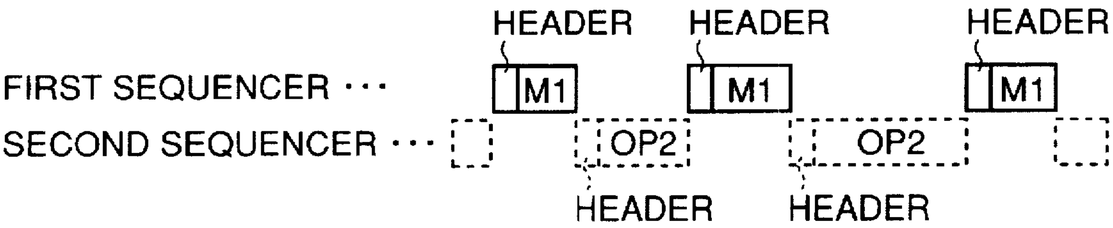

The following describes the operation of the music play apparatus practiced as the second embodiment. FIG. 4(A) shows the state of the data transfer from the data supply unit 100 to the sound source unit 200 in time sequence. First, before the operation of the present embodiment starts, it is assumed that a music piece to be played first and subsequent music pieces are selected by the user through an operator section not shown, assumed that files of the music pieces to be played at odd-numbered sequence are supplied to the first sequencer 110, and assumed that files of music pieces to be played at even-numbered sequence are supplied to the second sequencer 120. It is also assumed that the memory bank 232 is addressed by the initialization setter 233 and the effect setter 234 in the initial state.

Based on the above-mentioned initial settings, the controller 130 controls, the first sequencer 110 at time t1 to output the control parameters OP1 associated with the first music piece upon a request for starting reproduction of the first music piece. The first sequencer 110 outputs the control parameters OP1 associated with the first music piece. The transmitter 140 transmits the parameters OP1 together with a header which indicates that the parameters OP1 are supplied from the first sequencer 110. Data containing the control parameters OP1 outputted from the first sequencer 110 are transferred to the sound source unit 200 via the transmitter 140. Then, the transmitted data are demultiplexed by the receiver 210 to extract therefrom the control parameters together with the affixed header. At this point of time, other data than the control parameters are not extracted because the transmitted data only contains the control parameters. The extracted initialization data is stored in the memory bank 231 corresponding to the first sequencer 110 via the bank selector 230 according to the affixed header.

By such a manner, all of the control parameters OP1 are transferred to the bank memory 231.Then, the controller 130 operates at time t2 for controlling the first sequencer 110 to time-sequentially output the performance data M1 of the first music piece according to a predetermined tempo. The transmitter 140 transmits the performance data M1 to the sound source unit 200 together with the header which indicates that the performance data M1 is provided from the first sequencer 110. In the sound source unit 200, the receiver 210 extracts the performance data M1, and interprets the header affixed to the performance data M1 to feed a command BCC to the controller 220 to notify thereto that the received performance data is provided from the first sequencer 110. Further, the receiver 210 feeds the performance data without the header to the channel assignor 240.

Just before time t2, the complete set of the control parameters OP1 is loaded into the parameter bank 231. Further, the controller 220 operates upon receipt of the command BBC for controlling the initialization setter 233 and the effect setter 234 to address the parameter bank 231 allotted to the first sequencer 110. Consequently, the tone generator 241 and the effect creator 243 are initialized according to the parameters OP1 to thereby adapt for the first music piece. Consequently, the tone generator 241 processes the time-sequentially provided performance data M1 after time t2 according to the control parameters OP1 to generate the musical tones of the first music piece, while the effect creator 243 imparts the desired effect to the generated musical tones according to the control parameters OP1.

The above-mentioned performance data is transferred in a train of segments each corresponding to each of note events as shown in FIG. 4(B). There exist many time slots between the segments of the performance data M1 after time t2. Using these time slots, the controller 130 controls the second sequencer 120 to output the control parameters OP2 associated with the second music piece after time t2. The control parameters OP2 thus outputted are multiplexed by the transmitter 140 with the performance data M1 outputted by the first sequencer 110. At this time, the transmitter 140 affixes a header which indicates that the control parameters OP2 are supplied from the second sequencer 120. The multiplexed data is transferred to the sound source unit 200. Namely, when the first music piece is being played after time t2, the control parameters OP2 associated with the second music piece are transferred to the sound source unit 200. The control parameters OP2 are interlaced into the time slots provided in the train of the performance data M1. Then, the control parameters OP2 transferred to the sound source unit 200 are demultiplexed by the receiver 210, and are supplied to the bank selector 230. The bank selector 230 selects the memory bank 232 after interpreting the header affixed to the control parameters OP2 so that the control parameters OP2 are stored in the memory bank 232. As described, while the first music piece is being played by transferring the performance data M1, the control parameters OP2 associated with the second music piece can all be stored in the corresponding memory bank 232.

After the play of the first music piece is finished, the controller 130 operates at time t3 for controlling the second sequencer 120 to time-sequentially output the performance data M2 of the second music piece according to a predetermined tempo. The transmitter 140 transmits the performance data M2 to the sound source unit 200 together with the header which indicates that the performance data M2 is provided from the second sequencer 120. In the sound source unit 200, the receiver 210 extracts the performance data M2, and interprets the header affixed to the performance data M2 to feed a command BCC to the controller 220 to notify thereto that the received performance data is provided from the second sequencer 120. Further, the receiver 210 feeds the performance data M2 without the header to the channel assignor 240.

Just before time t3, the complete set of the control parameters OP2 is loaded into the parameter bank 232. Further, the controller 220 operates upon receipt of the command BCC for controlling the initialization setter 233 and the effect setter 234 to address the parameter bank 232 allotted to the second sequencer 120. Consequently, the tone generator 241 and the effect creator 243 are reset according to the parameters OP2 to thereby adapt for the second music piece. Consequently, the tone generator 241 processes the time-sequentially provided performance data M2 after time t3 according to the control parameters OP2 to generate the musical tones of the second music piece, while the effect creator 243 imparts the desired effect to the generated musical tones according to the control parameters OP2.

After time t3, the controller 130 controls the second sequencer 120 to output the performance data M2 associated with the second music piece, while the controller 130 controls the first sequencer 110 to output control parameters OP3 associated with the third music piece. The control parameters OP3 thus outputted are multiplexed by the transmitter 140 with the performance data M2 outputted by the second sequencer 120. At this time, the transmitter 140 affixes a header which indicates that the control parameters OP3 are supplied from the first sequencer 110. The multiplexed data is transferred to the sound source unit 200. The control parameters OP3 are interlaced into the time slots provided in the train of the performance data M2. Then, the control parameters OP2 transferred to the sound source unit 200 are demultiplexed by the receiver 210, and are supplied to the bank selector 230. The control parameters OP3 are stored in the memory bank 231. As described, while the second music piece is being played by transferring the performance data M2, the control parameters OP3 associated with the third music piece can all be stored in the corresponding memory bank 231 .

After the play of the second music piece is finished according to the performance data M2, the controller 130 controls the first sequencer 110 at time t4 to output the performance data M3 associated with the third music piece, while the controller 130 controls the second sequencer 120 to output control parameters OP4 associated with the fourth music piece. The control parameters OP4 thus outputted are multiplexed by the transmitter 140 with the performance data M3. The control parameters OP4 are interlaced into the time slots provided in the train of the performance data M3.

In similar manner, After the play of (n−1)-th music piece is finished according to the performance data M(n−1), the controller 130 controls one sequencer to output the performance data Mn associated with the n-th music piece, while the controller 130 controls the other sequencer to output control parameters OP(n+1) associated with the (n+1)-th music piece. The control parameters OP(n+1) thus outputted are multiplexed by the transmitter 140 with the performance data Mn. The control parameters OP(n+1) are interlaced into the time slots provided in the train of the performance data Mn.

Figure 5:
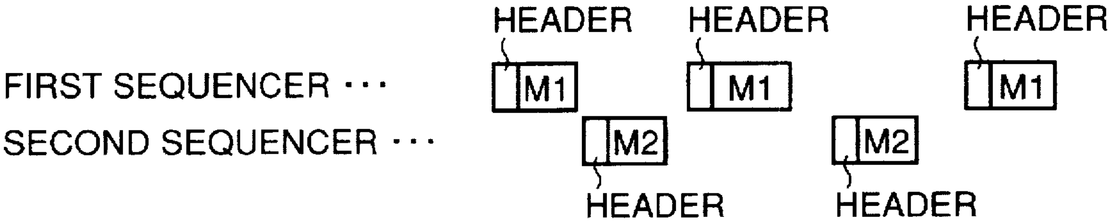
FIG. 5 is a diagram illustrating a state of transferring the performance data in the embodiment of FIG. 3.

In this embodiment, the music play apparatus can cross-fade a preceding music piece and a succeeding music piece without increasing a number of the channels of the tone generator 241. As shown in FIG. 5, the controller 130 operates before the end of the play of n-th music piece for controlling the first and second sequencers 110 and 120 to concurrently output last segments of the performance data Mn and top segments of the performance data M(n+1) in interlaced manner. By such a manner, the n-th music piece fades out and the (n+1)-th music piece fades in. In such a case, the tone generator 241 operates according to the control parameters Mn provided in advance for generating the musical tones of the n-th music piece, and the effect creator 243 imparts the effect to the musical tones of the n-th music piece according to the control parameters Mn. On the other hand, the tone generator 241 operates according to the control parameters M(n+1) provided in advance for generating the musical tones of the (n+1)-th music piece, and the effect creator 243 imparts the effect to the musical tones of the (n+1)-th music piece according to the control parameters M(n+1).

For summary, in this embodiment, the sequencer device composed of the sequencers 110 and 120 and the controller 130 processes the performance data of the preceding music piece to form a train of segments of the performance data, and processes the initialization data of the succeeding music piece to form another train of segments of the initialization data. The transmitter device composed of the transmitter 140 interlaces the segments of the initialization data into the segments of the performance data to form a composite train which alternately contains the segments of the performance data of the preceding music piece and the segments of the initialization data of the succeeding music piece. In such a case, the sequencer device affixes a header to each segment of the performance data of the preceding music piece to indicate that each segment is associated to the preceding music piece, and affixes another header to each segment of the initialization data of the succeeding music piece to indicate that each segment is associated to the succeeding music piece. The sound source unit 200 discriminates the performance data and the initialization data from each other according to the headers affixed thereto. In a form, the transmitter device concurrently transmits last segments of the performance data of the preceding music piece and top segments of the performance data of the succeeding music piece with each other so that the sound source unit 200 can cross-fade the preceding music piece and the succeeding music piece during the non-interruptive reproduction of the preceding music piece and the succeeding music piece.

Figure 6:
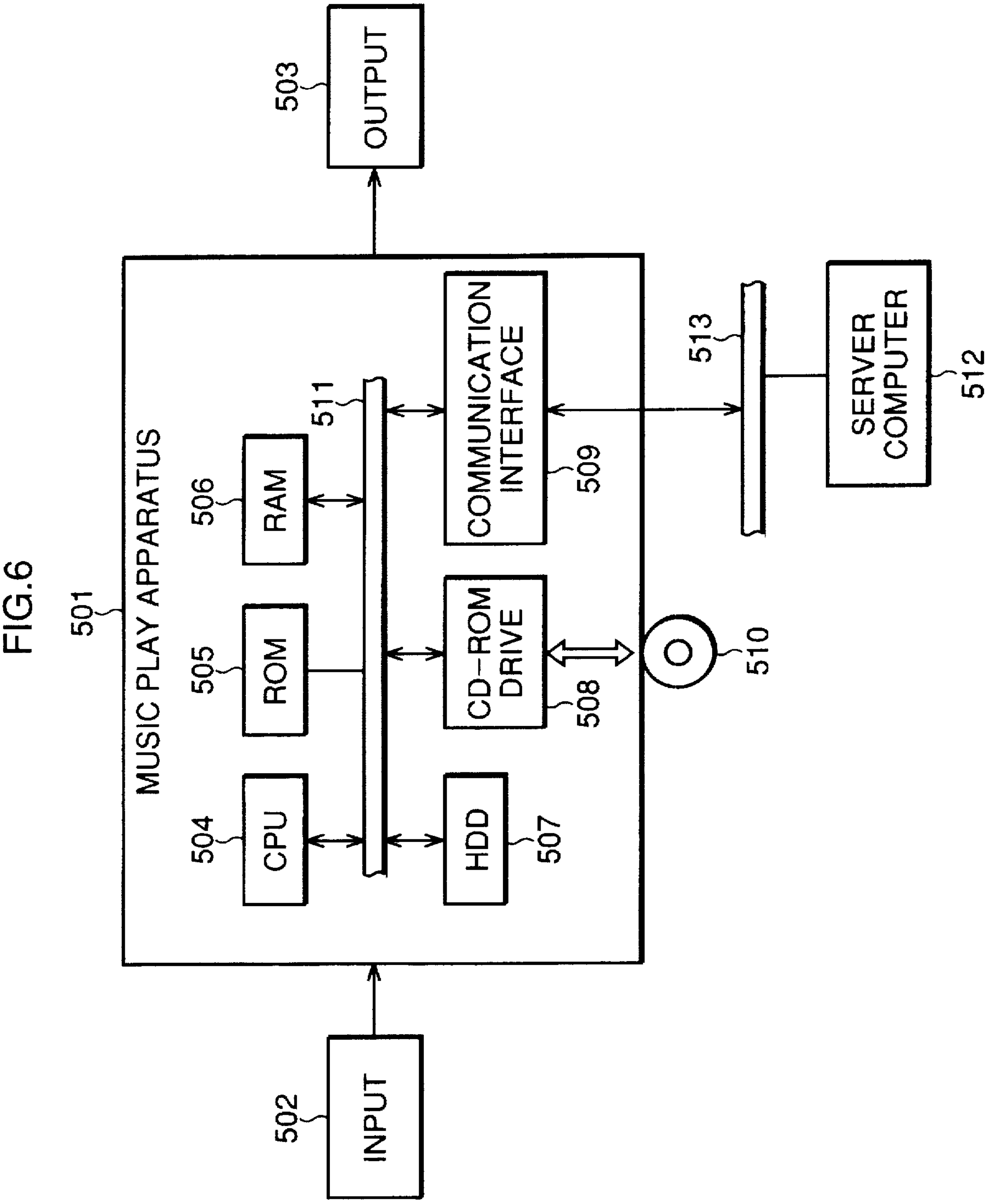
FIG. 6 is a block diagram illustrating a functional constitution of the music play apparatus practiced as a third preferred embodiment of the present invention.

FIG. 6 shows the third embodiment of the inventive music play apparatus. The music play apparatus 501 is connected between an input 502 and an output 503 for successively reproducing music pieces in response to a request inputted by the input 502. The reproduced music pieces are sounded from the output 503. The music play apparatus 501 composed of a data supply unit and a sound source unit is implemented by a personal computer composed of CPU 504, ROM 505, RAM 506, HDD (hard disk drive) 507, CD-ROM drive 508, and communication interface 509. The storage such as ROM 505 and HDD 507 can store various data and various programs including an operating system program and an application program which is executed to reproduce the music pieces in continuous manner. Normally, the ROM 505 or HDD 507 provisionally stores these programs. However, if not, any program may be loaded into the music play apparatus 501. The loaded program is transferred to the RAM 506 to enable the CPU 504 to operate the inventive system of the music play apparatus 501. By such a manner, new or version-up programs can be readily installed in the system. For this purpose, a machine readable media such as a CD-ROM (Compact Disc Read Only Memory) 510 is utilized to install the program. The CD-ROM 510 is set into the CD-ROM drive 508 to read out and download the program from the CD-ROM 510 into the HDD 507 through a bus 511. The machine readable media may be composed of a magnetic disk or an optical disk other than the CD-ROM 510. The communication interface 509 is connected to an external server computer 512 through a communication network 513 such as LAN (Local Area Network), public telephone network and INTERNET. If the internal storage does not reserve needed data or program, the communication interface 509 is activated to receive the data or program from the server computer 512. The CPU 504 transmits a request to the server computer 512 through the interface 509 and the network 513. In response to the request, the server computer 512 transmits the requested data or program to the music play apparatus 501. The transmitted data or program is stored in the storage to thereby complete the downloading.

The inventive music play apparatus 501 can be implemented by a personal computer machine which is installed with the needed data and programs. In such a case, the data and programs are provided to the user by means of the machine readable media such as the CD-ROM 510 or a floppy disk. The machine readable media contains instructions for causing the music play apparatus comprised of a data supply for providing performance data and initialization data associated to a desired music piece and a sound source for reproducing the music piece according to the performance data and the initialization data, to perform a method comprising the steps of time-sequentially processing at least a pair of performance data corresponding to a first music piece and a second music piece in the data supply, transmitting each of the processed performance data from the data supply to the sound source, multiplexing the initialization data of the second music piece with the performance data of the first music piece when the same is transmitted to the sound source, successively receiving the performance data of the first music piece and the second music piece in the sound source, demultiplexing the initialization data of the second music piece from the performance data of the first music piece when the same is received by the sound source, temporarily storing the demultiplexed initialization data of the second music piece while the first music piece is being reproduced by the sound source, and customizing the sound source to the second music piece by the stored initialization data immediately after the reproduction of the first music piece is finished for readily starting the reproduction of the second music piece according to the performance data thereof to thereby ensure substantially non-interruptive reproduction of the first music piece and the second music piece.

In a form, the step of time-sequentialy processing comprises processing the performance data of the first music piece to form a train of segments of the performance data and processing the initialization data of the second music piece to form another train of segments of the initialization data, and the step of multiplexing comprises interlacing the segments of the initialization data into the segments of the performance data to form a composite train which alternately contains the segments of the performance data of the first music piece and the segments of the initialization data of the second music piece. In another preferred form, the step of time-sequentialy processing comprises affixing a header to each segment of the performance data of the first music piece to indicate that each segment is associated to the first music piece and affixing another header to each segment of the initialization data of the second music piece to indicate that each segment is associated to the second music piece, so as to enable the sound source to discriminate the performance data and the initialization data from each other according to the headers affixed thereto.

As described above and according to the present invention, while the first music piece is being played, the initialization data associated with the second music piece is transferred to the sound source unit and stored in the memory device thereof. At the same time, initialization of the sound source unit is performed based on the stored initialization data. This novel constitution eliminates necessity for separately transferring the initialization data associated with the second music piece after transferring the performance data associated with the first music piece, thereby shortening the time blank between the first and second music pieces.

While the preferred embodiments of the present invention have been described using specific terms, such description is for illustrative purposes only, and it is to be understood that changes and variations may be made without departing from the spirit or scope of the appended claims.

What is claimed is:

1. A music play apparatus comprising a data supply unit for providing performance data and initialization data associated to a desired music piece, and a sound source unit for reproducing the music piece according to the performance data and the initialization data, wherein;

the data supply unit comprises a sequencer device that time-sequentially processes a plurality of performance data according to a predetermined order of music pieces, and a transmitter device that transmits each of the processed performance data, the transmitter device being operative when transmitting the performance data of a preceding music piece to interlace the initialization data of a succeeding music piece into the performance data of the preceding music piece by multiplexing operation, and wherein;

the sound source unit comprises a receiver device that successively receives the performance data in the predetermined order, the receiver device being operative when receiving the performance data of the preceding music piece to separate therefrom the initialization data of the succeeding music piece by demultiplexing operation, a memory device that temporarily stores the separated initialization data of the succeeding music piece while the preceding music piece is being reproduced, and a tone generator device that is customized to the succeeding music piece by the stored initialization data immediately after the reproduction of the preceding music piece is finished, and then readily starts the reproduction of the succeeding music piece according to the performance data thereof which is fed from the receiver device to thereby ensure substantially non-interruptive reproduction of the preceding music piece and the succeeding music piece.

2. A music play apparatus according to claim 1, wherein the sound source unit further comprises a selector device that operates when the reproduction of the preceding music piece is finished for switching the memory device from one memory bank which stores the initialization data of the preceding music piece to another memory bank which stores the initialization data of the succeeding music piece, and for resetting the tone generator device upon switching of the memory device to customize the tone generator device to the succeeding music piece.

3. A music play apparatus according to claim 2, wherein the selector device includes a bank selector that connects said one memory bank to the receiver device when the same receives the performance data of the succeeding music piece so as to load said one memory bank with new initialization data which is separated from the performance data of the succeeding music piece by the receiver device.

4. A music play apparatus according to claim 1, wherein the tone generator device is customized to the succeeding music piece for generating musical tones having a timbre adapted to the succeeding music piece.

5. A music play apparatus according to claim 4, wherein the tone generator device is further customized to the succeeding music piece for imparting an effect to the musical tones in matching with the succeeding music piece.

6. A music play apparatus according to claim 1, wherein the sequencer device processes the performance data of the preceding music piece to form a train of segments of the performance data, and processes the initialization data of the succeeding music piece to form another train of segments of the initialization data, and wherein the transmitter device interlaces the segments of the initialization data into the segments of the performance data to form a composite train which alternately contains the segments of the performance data of the preceding music piece and the segments of the initialization data of the succeeding music piece.

7. A music play apparatus according to claim 6, wherein the sequencer device affixes a header to each segment of the performance data of the preceding music piece to indicate that each segment is associated to the preceding music piece, and affixes another header to each segment of the initialization data of the succeeding music piece to indicate that each segment is associated to the succeeding music piece, and wherein the sound source unit discriminates the performance data and the initialization data from each other according to the headers affixed thereto.

8. A music play apparatus according to claim 6, wherein the transmitter device concurrently transmits last segments of the performance data of the preceding music piece and top segments of the performance data of the succeeding music piece with each other so that the sound source unit can cross-fade the preceding music piece and the succeeding music piece during the non-interruptive reproduction of the preceding music piece and the succeeding music piece.

9. A music play apparatus comprising a data supply for providing performance data and initialization data associated to a desired music piece, and a sound source for reproducing the music piece according to the performance data and the initialization data, wherein;

the data supply comprises sequencer means for time-sequentially processing at least a pair of performance data corresponding to a first music piece and a second music piece, and transmitter means for transmitting each of the processed performance data, the transmitter means being operative when transmitting the performance data of the first music piece for multiplexing the initialization data of the second music piece with the performance data of the first music piece, and wherein;

the sound source comprises receiver means for successively receiving the performance data of the first music piece and the second music piece, the receiver means being operative when receiving the performance data of the first music piece to demultiplex therefrom the initialization data of the second music piece, memory means for temporarily storing the demultiplexed initialization data of the second music piece while the first music piece is being reproduced, and tone generator means customized to the second music piece by the stored initialization data immediately after the reproduction of the first music piece is finished for readily starting the reproduction of the second music piece according to the performance data thereof which is fed from the receiver means to thereby ensure substantially non-interruptive reproduction of the first music piece and the second music piece.

10. A music play apparatus according to claim 9, wherein the sequencer means processes the performance data of the first music piece to form a train of segments of the performance data, and processes the initialization data of the second music piece to form another train of segments of the initialization data, and wherein the transmitter means interlaces the segments of the initialization data into the segments of the performance data to form a composite train which alternately contains the segments of the performance data of the first music piece and the segments of the initialization data of the second music piece.

11. A music play apparatus according to claim 9, wherein the sequencer means affixes a header to each segment of the performance data of the first music piece to indicate that each segment is associated to the first music piece, and affixes another header to each segment of the initialization data of the second music piece to indicate that each segment is associated to the second music piece, and wherein the sound source discriminates the performance data and the initialization data from each other according to the headers affixed thereto.

12. A method of operating a music play apparatus having a data supply for providing performance data and initialization data associated to a desired music piece, and a sound source for reproducing the music piece according to the performance data and the initialization data, the method comprising the steps of:

time-sequentially processing at least a pair of performance data corresponding to a first music piece and a second music piece in the data supply;

transmitting each of the processed performance data from the data supply to the sound source;

multiplexing the initialization data of the second music piece with the performance data of the first music piece when the same is transmitted to the sound source;

successively receiving the performance data of the first music piece and the second music piece in the sound source;

demultiplexing the initialization data of the second music piece from the performance data of the first music piece when the same is received by the sound source;

temporarily storing the demultiplexed initialization data of the second music piece while the first music piece is being reproduced; and customizing the sound source to the second music piece by the stored initialization data immediately after the reproduction of the first music piece is finished for readily starting the reproduction of the second music piece according to the performance data thereof to thereby ensure substantially non-interruptive reproduction of the first music piece and the second music piece.

13. A method according to claim 12, wherein the step of time-sequentialy processing comprises processing the performance data of the first music piece to form a train of segments of the performance data and processing the initialization data of the second music piece to form another train of segments of the initialization data, and wherein the step of multiplexing comprises interlacing the segments of the initialization data into the segments of the performance data to form a composite train which alternately contains the segments of the performance data of the first music piece and the segments of the initialization data of the second music piece.

14. A method according to claim 13, wherein the step of time-sequentialy processing comprises affixing a header to each segment of the performance data of the first music piece to indicate that each segment is associated to the first music piece and affixing another header to each segment of the initialization data of the second music piece to indicate that each segment is associated to the second music piece, so as to enable the sound source to discriminate the performance data and the initialization data from each other according to the headers affixed thereto.

15. A machine readable media containing instructions for causing a music play machine having a data supply for providing performance data and initialization data associated to a desired music piece and a sound source for reproducing the music piece according to the performance data and the initialization data, to perform a method comprising the steps of:

time-sequentially processing at least a pair of performance data corresponding to a first music piece and a second music piece in the data supply;

transmitting each of the processed performance data from the data supply to the sound source;

multiplexing the initialization data of the second music piece with the performance data of the first music piece when the same is transmitted to the sound source;

successively receiving the performance data of the first music piece and the second music piece in the sound source;

demultiplexing the initialization data of the second music piece from the performance data of the first music piece when the same is received by the sound source;

temporarily storing the demultiplexed initialization data of the second music piece while the first music piece is being reproduced by the sound source; and customizing the sound source to the second music piece by the stored initialization data immediately after the reproduction of the first music piece is finished for readily starting the reproduction of the second music piece according to the performance data thereof to thereby ensure substantially non-interruptive reproduction of the first music piece and the second music piece.

16. A machine readable media according to claim 15, wherein the step of time-sequentialy processing comprises processing the performance data of the first music piece to form a train of segments of the performance data and processing the initialization data of the second music piece to form another train of segments of the initialization data, and wherein the step of multiplexing comprises interlacing the segments of the initialization data into the segments of the performance data to form a composite train which alternately contains the segments of the performance data of the first music piece and the segments of the initialization data of the second music piece.

17. A machine readable media acording to claim 16, wherein the step of time-sequentialy processing comprises affixing a header to each segment of the performance data of the first music piece to indicate that each segment is associated to the first music piece and affixing another header to each segment of the initialization data of the second music piece to indicate that each segment is associated to the second music piece, so as to enable the sound source to discriminate the performance data and the initialization data from each other according to the headers affixed thereto.

* * * * *